United States Patent
Dawson et al.

(10) Patent No.: US 7,252,421 B2
(45) Date of Patent: Aug. 7, 2007

(54) VEHICULAR LIGHT ASSEMBLY AND RELATED METHOD

(75) Inventors: Richard M. Dawson, Dowling, MI (US); Lance L. Wilson, Grand Rapids, MI (US); Gregory A. Matheson, Grand Rapids, MI (US)

(73) Assignee: A & L Assembly, LLC, Vermontville, MI (US)

( * ) Notice: Subject to any disclaimer, the term of this patent is extended or adjusted under 35 U.S.C. 154(b) by 105 days.

(21) Appl. No.: 11/243,635

(22) Filed: Oct. 5, 2005

(65) Prior Publication Data

US 2007/0076419 A1   Apr. 5, 2007

(51) Int. Cl.
*B60Q 1/00* (2006.01)

(52) U.S. Cl. ............... 362/519; 362/510; 362/549; 362/547; 362/548

(58) Field of Classification Search ............ 362/514, 362/519, 364–365, 652–659, 507, 538, 548–549, 362/546, 523, 510, 526, 294, 547, 373, 650, 362/378, 372, 353; 439/699.2, 619, 617–618
See application file for complete search history.

(56) References Cited

U.S. PATENT DOCUMENTS

| | | | |
|---|---|---|---|
| 4,219,870 A * | 8/1980 | Haraden et al. ............. 362/659 |
| 4,320,439 A | 3/1982 | Wiley |
| 4,388,679 A * | 6/1983 | Blaisdell et al. ............ 362/306 |
| 4,536,831 A | 8/1985 | English et al. |
| 4,879,491 A * | 11/1989 | Hirozumi et al. ........ 313/318.1 |
| 5,113,330 A | 5/1992 | Makita |
| 5,681,104 A * | 10/1997 | Chinniah et al. ........... 362/538 |
| 5,897,196 A * | 4/1999 | Soskind et al. ............. 362/507 |
| 5,951,151 A | 9/1999 | Doubeck et al. |
| 6,116,758 A | 9/2000 | Lin |
| 6,364,503 B1 | 4/2002 | Wenzel et al. |
| 6,386,725 B1 | 5/2002 | Amburgey |
| 6,425,679 B1 | 7/2002 | Yu |
| 6,554,457 B1 | 4/2003 | Platt |
| 7,033,053 B2 * | 4/2006 | Watson et al. .............. 362/515 |
| 2003/0179577 A1 | 9/2003 | Marsh |
| 2004/0228135 A1 | 11/2004 | Myburgh |

FOREIGN PATENT DOCUMENTS

EP   0 713 998 A1   5/1996
EP   0 740 105 A1   10/1996

* cited by examiner

*Primary Examiner*—Renee Luebke
*Assistant Examiner*—Robert May
(74) *Attorney, Agent, or Firm*—Warner Norcross & Judd LLP

(57) ABSTRACT

A vehicular light assembly including a dichroic lamp, a socket, a cradle and an optional support to mount the assembly to a vehicle. The dichroic lamp includes a reflector which reflects light emitted by the bulb forward but allows radiant heat to pass rearwardly through the reflector. The dichroic lamp also includes an electrode electrically coupled with a socket which defines at least one of a recess and an aperture, the socket including an electrical connector. The cradle defines a chamber, and the socket and dichroic lamp both are positioned in the chamber. The cradle includes a locating pin that registers with the at least one of a recess and an aperture to selectively locate the dichroic lamp within the cradle. A related installation method includes: joining the light assembly cradle with a vehicle, and aligning the lamp assembly so that it focuses light on a pathway of the vehicle.

13 Claims, 4 Drawing Sheets

VEHICULAR LIGHT ASSEMBLY AND RELATED METHOD

BACKGROUND OF THE INVENTION

The present invention relates to lighting systems, and more particularly to lighting systems for vehicles.

Most vehicles include lights for night-time or low-light operation. For example, many automobiles, recreational vehicles, off-road vehicles, tractors, snow blowers and the like include a conventional lighting system that illuminates a path in front of the vehicle and/or an area of interest to the vehicle operator. Such conventional lighting systems usually include a bulb, a socket and a reflector. The bulb is plugged into the socket, which is secured to the reflector. The bulb projects into a concave chamber defined by the reflector. The reflector is coated with a reflective substance to focus light produced by the bulb. The socket usually includes a rubber seal that seals around the bulb to prevent dust and debris from entering through the socket and diminishing the reflective capacity of the reflector. The front of the reflector is covered with a lens which may or may not focus light emitted by the bulb and reflected by the reflector.

Although conventional vehicular lighting systems provides illumination for vehicles, they present several challenges. First, due to vehicle vibration, the bulb sometimes becomes unplugged from the socket or damaged in such a manner that the electrical coupling between the socket and bulb is terminated. Second, the seal around the socket can fail, allowing dust to enter the reflector and coat the bulb, which can result in diminished light transmission. Third, the socket and bulb require a solid mechanical connection to minimize the possibility of the bulb disengaging from the socket. Fourth, the bulb can require a complicated system to accurately align the bulb in the reflector so that the light produced by the bulb is efficiently projected forward. This can require additional components and hardware, making the lighting assembly costly and labor intensive to produce.

SUMMARY OF THE INVENTION

The aforementioned problems are overcome in the present invention which provides a vehicular light assembly including a dichroic lamp, a socket, a cradle and an optional support structure to mount the assembly to a vehicle.

In a first embodiment, the dichroic lamp includes a halogen bulb secured to a reflector that reflects substantially all light forward, but allows radiant heat to pass rearwardly through the reflector. The dichroic lamp includes electrodes that project rearwardly to provide electrical communication with the bulb. These prongs plug into terminals defined by the socket. The socket optionally includes a recess or aperture.

In a second embodiment, the cradle defines a chamber that opens at one end. At the other end, the chamber is at least partially bound by a base. The base includes at least one locating pin. The dichroic lamp and socket are nested within the cradle chamber, with the locating pin registered in the socket recess or aperture to selectively position the lamp in the cradle.

In a third embodiment, an optional securing device is provided to further secure the dichroic lamp in the cradle. This device can be a horn pin, alligator clip, or other fastening device that engages grooves on the rearward side of the dichroic lamp to secure it within the cradle.

In a fourth embodiment, the cradle is joined with the support structure to mount the cradle to a vehicle component and/or panel. Optionally, the support structure is positioned on an exterior of a vehicle panel, and the cradle is mounted on the interior of the panel so that the cradle is not visible from the exterior of the vehicle. Further optionally, the cradle and support structure are mounted to the vehicle component and/or panel so that the dichroic lamp is positioned to illuminate a path of the vehicle.

The vehicular light assembly provides a simple and efficient lighting system for vehicle. The cradle locating pin(s) accurately and consistently mount the lamp within the cradle. The dichroic lamp and socket registration ensure a secure electrical connection. The cradle and support structure accurately align the light assembly relative to the vehicle to ensure that light is projected along a vehicle pathway or other area as desired. When included, the optional securing device can provide additional securement for components of the lamp assembly.

These and other objects, advantages, and features of the invention will be more fully understood and appreciated by reference to the description of the current embodiment and the drawings.

DESCRIPTION OF THE CURRENT EMBODIMENT

Figure 1:
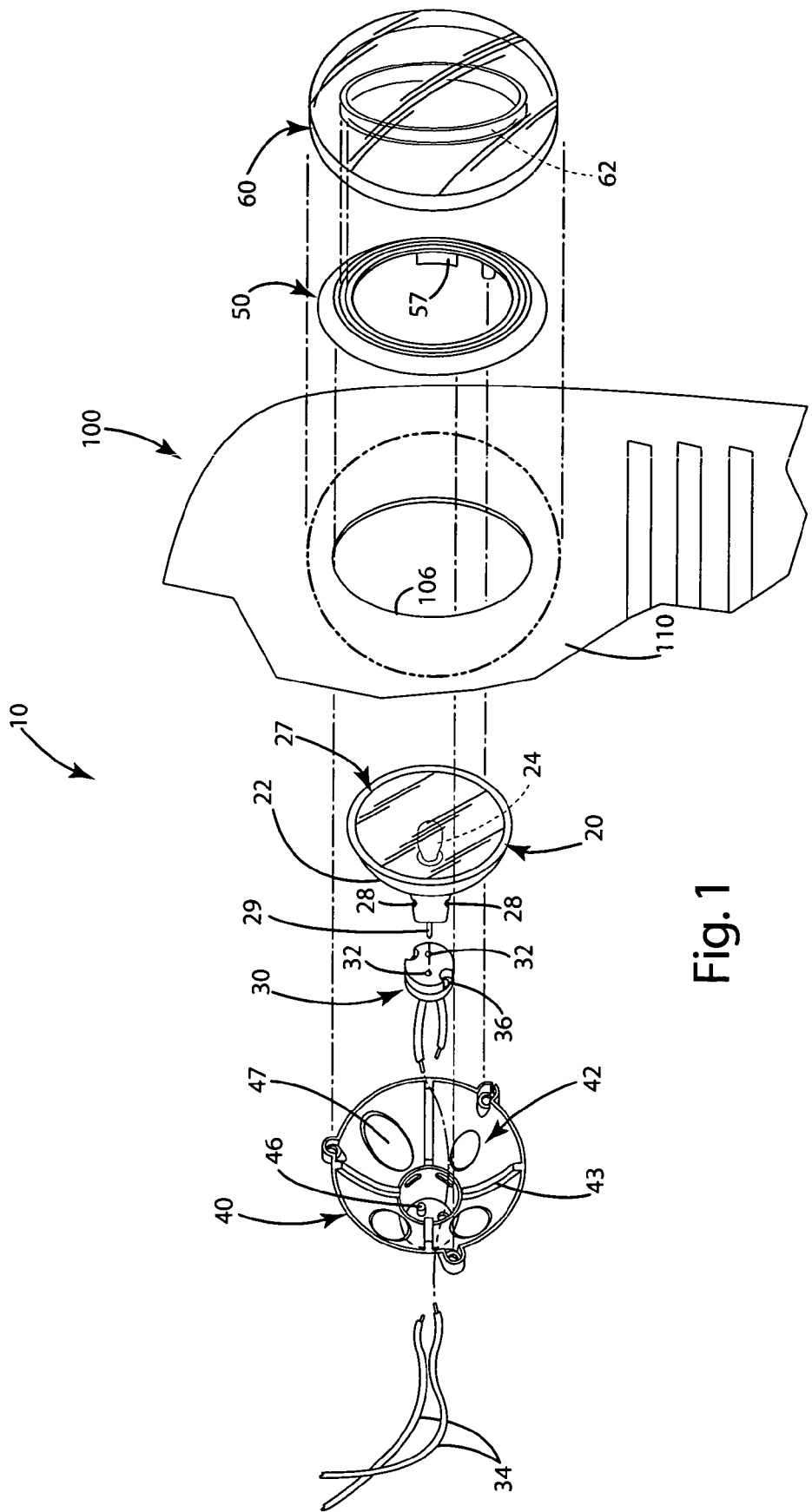
FIG. 1 is an exploded view of the vehicular lighting assembly of the present invention.

A vehicular light assembly is illustrated in the drawings and generally designated 10. The assembly 10 includes a dichroic lamp 20, a socket 30, a cradle 40 and an optional support structure or member 50 to mount the assembly to the vehicle 100. The dichroic lamp 20 is electrically coupled to the socket 30, which is further coupled to a power source, for example a battery 122 of the vehicle. As described herein, the vehicular light assembly is described in connection with a lawn tractor, however, the assembly is well suited for a variety of other vehicles, including but not limited to automobiles, recreational vehicles, off-road vehicles, tractors, snow blowers and the like.

The dichroic lamp 20 is includes a reflector 22 and a bulb 24 permanently secured within the reflector. The reflector can be metalized, that is, coated with a thin layer of metal, for example a dichroic reflective coating. In one embodiment, the lamp allows about 60% of the radiant heat to transmit rearwardly through the reflector surface, while reflecting about 95% to about 99% of visible light forward relative to the reflector. The bulb 24 is preferably a halogen bulb or capsule that is permanently fixed in position relative to the reflector via being encased in an insulating material also secured to the reflector. The lamp 20 also can include a rearward portion 26 in which grooves 28 are defined. These grooves 28 can be linear and generally perpendicular to a longitudinal axis of the bulb. In addition, the lamp 20 can include electrical prongs 29 that project from the rearward portion 26. Dichroic lamps suitable for use with the light assembly 10 include MR-16, MR-11 and cool beam par lamps.

Optionally, the opening of the lamp reflector can be covered with a lens 27 to provide an added safety feature should the bulb burst. The lamp 20 can also be hermetically sealed with the lens covering the opening.

The socket 30 can be constructed from an electrical insulating material, and include one or more terminal holes 32 which are adapted to receive and secure to the lamp prongs 29. The socket can further include electrical wires 34 extending therefrom that are adapted to connect to a power supply, such as a battery or electrical system 122 of the vehicle 100. The electrical wires can conduct power to the socket, and subsequently cause the lamp 20 to illuminate. The socket also can include at least one aperture or recess 36 in the surface opposite the surface in which the terminal holes 32 are defined. Other locations for the apertures 36 can include the sides of the socket.

The cradle 40 defines a cradle chamber 42 that can be sized and shaped to house substantially all of the socket 30 and the dichroic lamp 20. The cradle can include a base 44 that includes a hole through which the wires 34 can be positioned. The base can be of a generally cylindrical shape, and sized to house part or all of the socket 30. The base can transition to a bell-shaped portion 45, which can be sized and shaped to house part or all of the lamp 20. Of course, the base and bell can be of any shape or size as the application requires.

The bell 45 can define a plurality of vents 47 that assist in the dissipation of heat produced by the lamp. These vents may be of any shape, but as shown, are elliptical. The vents may also be place in any configuration as required by the application.

The cradle 40 also includes at least one locating pin 46 that can be positioned in or adjacent the base. The locating pins 46 optionally are sized and shaped so that they fit within the recess or apertures 36, and assist or fully locate the socket 30, and subsequently the lamp 20 in the cradle 40. Optionally, the locating pins generally center the bulb 24 in the cradle 40. The pins can be integral with the cradle, for example, integrally molded with the cradle when constructed from a plastic, metal or synthetic material. Optionally, the locating pins can be standard fasteners, such as screws, bolts or rods that are embedded in or otherwise fastened to the base 44 and project forward into the cradle chamber 42. However constructed, the pins can align with the socket recesses or apertures 36.

As shown in FIG. 1, the cradle 40 can optionally include ribs 43, which as shown are located in the bell 45, and generally follow the outer contours of the lamp 20. These ribs 43 can be shaped and configured to provide support for the rearward side of the lamp 20, and also to provide vibration protection. Optionally, the ribs 43 can center the lamp 20 as desired in conjunction with the locating pins.

Figure 2:
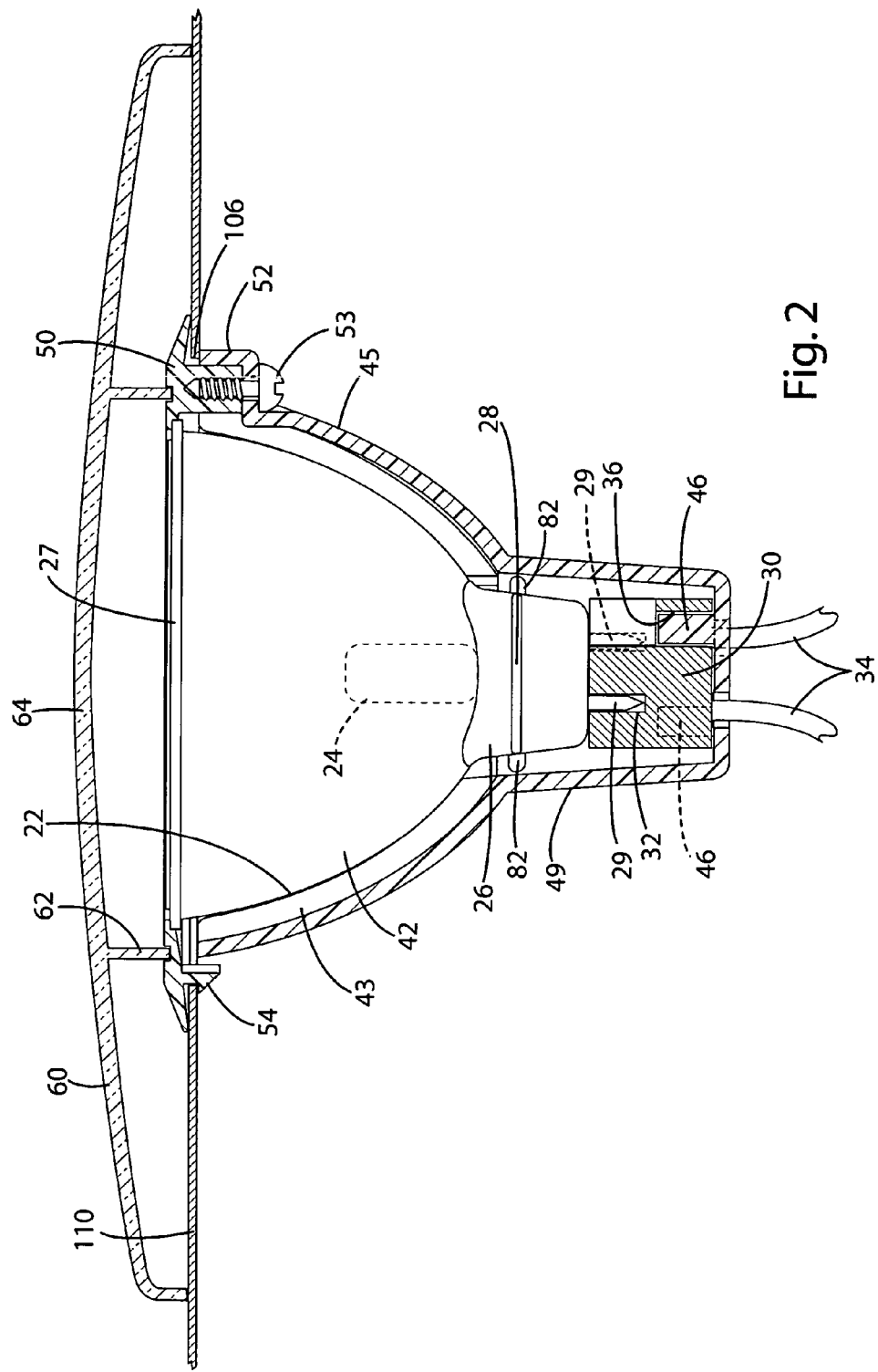
FIG. 2 is a sectional view of the vehicular lighting assembly installed on a body panel of a vehicle.

As shown in FIGS. 1 and 2, the light assembly 10 can include an optional support member 50 also referred to as a retaining frame or support structure. This support member 50 can be connected to the cradle in a variety of ways. As shown in FIG. 2, the support member 50 is a ring-like device that is shaped similarly to the opening of the cradle. Of course, the member need not be ring-like, and it may be of any desired shape or configuration. The member 50 includes multiple posts 52 that receive fasteners 53 that project through a portion of the cradle 40. These fasteners can be screws, bolts, rivets, or any other fastening device. The member 50 can optionally include hooked tabs 54. These hooked tabs can be configured and shaped to secure readily to an opening 106 in a vehicle body panel 110 or component. With the support member 50 secured to the body panel, the cradle is also supported and joined with the body panel or component. The support member, however, can include any other fastening device or feature that is capable of securing to a body panel and/or vehicle component. Also, as will be appreciated, the support member 50 may be entirely absent from the assembly 10, and the cradle attached directly to the vehicle body panel and/or component with conventional fasteners. For example, the cradle may be secure to the body panel with screws, bolts, rivets, or optionally integrally molded with the body panel and/or vehicle component. However attached, the cradle 40 sometimes may need to be adjusted to align the dichroic lamp 20 with a pathway 130 of the vehicle so that the dichroic lamp focuses light on that pathway. This may be done by moving the cradle 40 and/or member 50 relative to the body panel and/or component until proper alignment is achieved.

Optionally, the member 50 and cradle 40 can be constructed to provide additional securement of the dichroic lamp 20 and socket 30 within the cradle chamber 42. In such an embodiment, when the member is joined with the cradle, the socket 30 and lamp 20 fill the entire depth formed between the cradle base 44 and the member 50. In this embodiment, the member, when fully secured to the cradle, can exert a slight force on the lamp 20 and socket 30 to sandwich these components between the base 44 and member 50.

Figure 3:
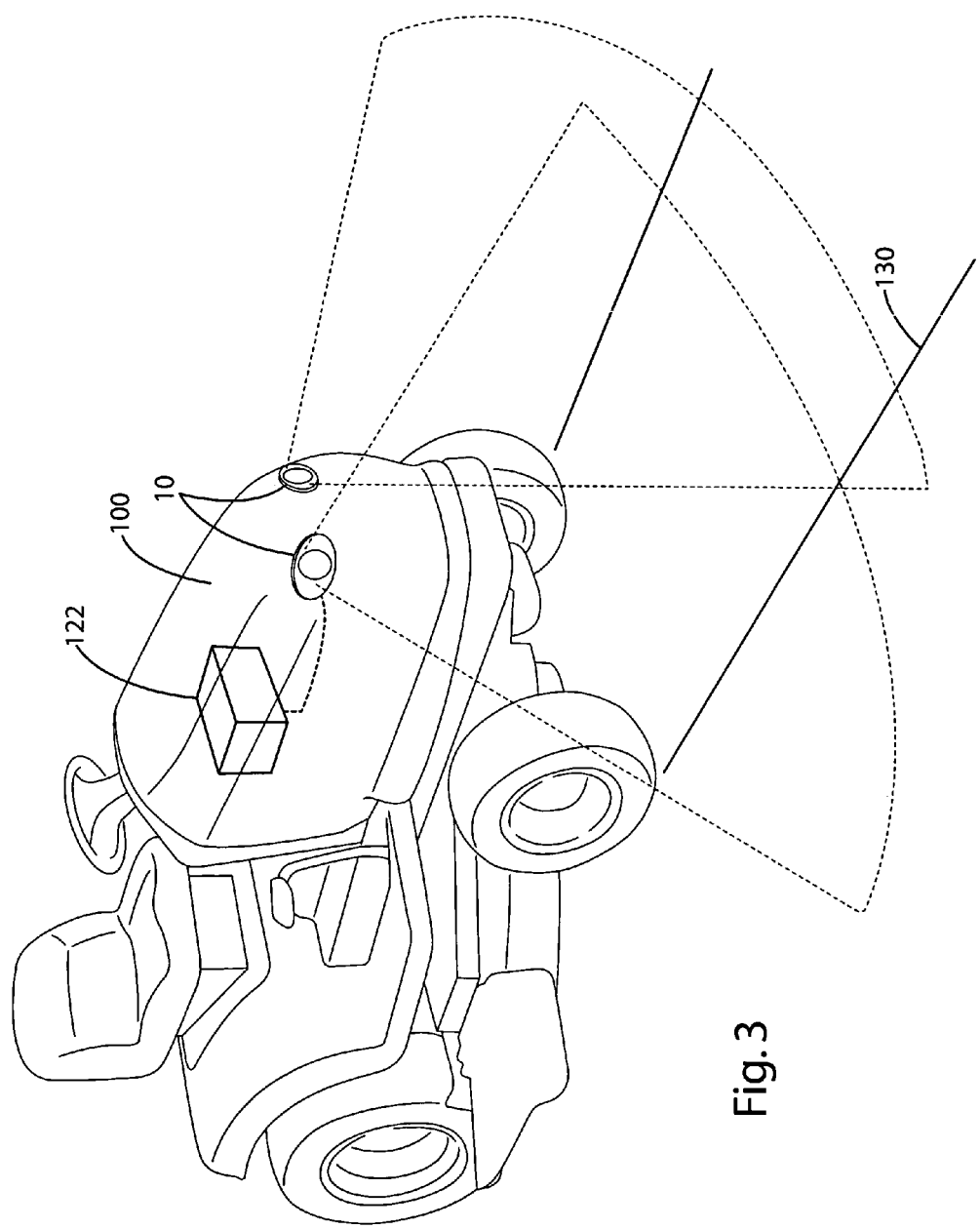
FIG. 3 is a perspective view of the vehicular lighting assembly installed on a vehicle in use.

As shown in FIGS. 2-3, the support member 50 is positioned on the exterior of the vehicle body panel and/or component, and joined with the cradle. The cradle 40 is positioned on the interior of the body panel and/or component, and not visible from the exterior of the vehicle. This configuration can provide an aesthetically pleasing appearance for the light assembly 10 when installed on the vehicle 100.

FIGS. 2-3 also show an optional lens 60 that can be included with the light assembly 10. This lens can include an internal ring 62 sonically welded, integrally formed with, or otherwise fastened or adhered to the member 50. The lens, particularly that portion 64, which is generally aligned with the dichroic lamp 20 can be constructed using conventional lens making techniques to focus light emitted from the lamp 20 in any type of desired beam, for example a flood beam and/or a searchlight beam.

Assembly and Operation

The vehicular light assembly 10 and its components are fabricated and assembled in generally conventional fashion. Only the steps, features, and functions associated with the present invention are described below.

To install the vehicular lamp assembly 10 on a vehicle 100, a user positions the cradle 40 in close proximity to an opening 106 defined by a vehicle body panel and/or component 110. The cradle 40 can be directly fastened to the vehicle body panel and/or component 110 with fasteners as described above, or it can be secured with the support member 50. When the support member is used, the support member can be secured to the exterior of the vehicle 100 so that it is optionally visible to an observer of the vehicle 100. The cradle 40 can be joined with the support member 20 so that the cradle is positioned in an interior of the vehicle, and hidden from the view of an observer.

Where the dichroic lamp 20 is to be powered by a power source of the vehicle, the connecting wires 34 extending from the socket are connected to the power source 122 of the vehicle and/or an electrical system that is in electrical communication with the power source.

With the cradle 40 installed, the lamp assembly 10 is aligned or adjusted so that it focuses or otherwise projects light on a pathway 130 of the vehicle. This alignment may be performed simply by moving the cradle 40 relative to the body panel and/or component. Alignment can also be performed simply by installing the cradle properly on the body panel and/or vehicle component. This proper installation optionally can include aligning the cradle 40 relative to markings or indicia on the cradle and/or the body panel and/or component.

Alternative Embodiments

Figure 4:
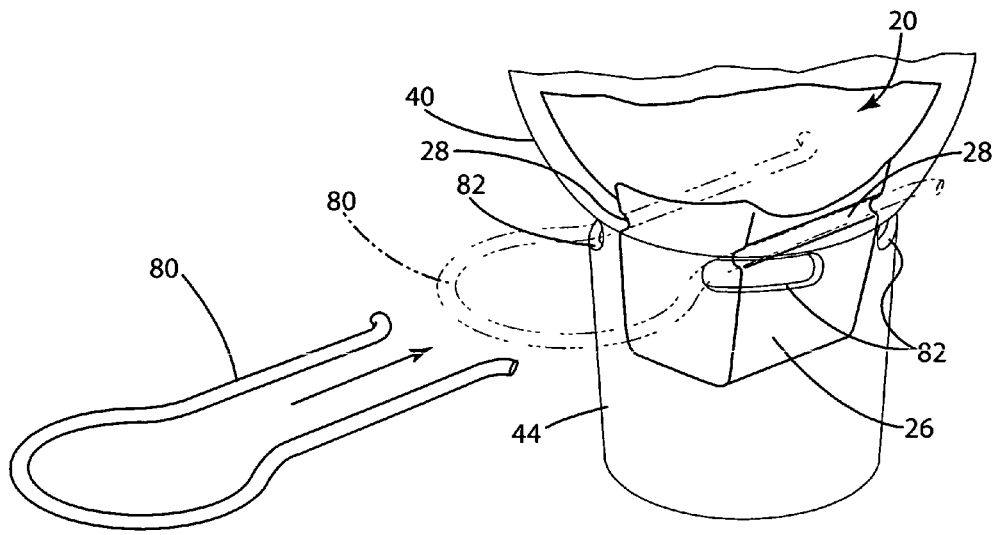
FIG. 4 is a perspective view of a first alternative embodiment of the vehicular lighting assembly.
Figure 5:
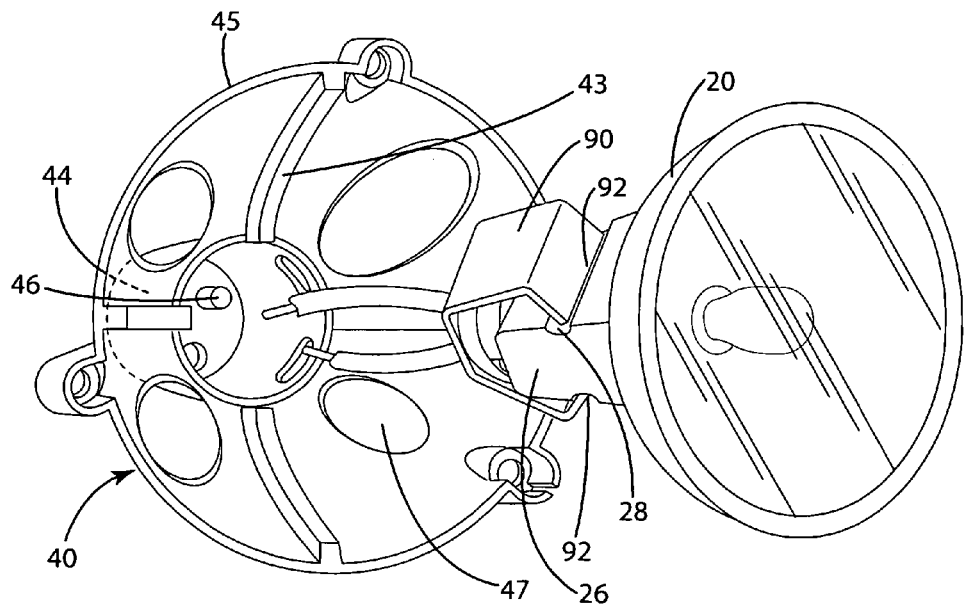
FIG. 5 is a perspective view of a second alternative embodiment of the vehicular lighting assembly.

The lamp 20 and/or socket 30 can be further secured within the cradle using one or more of a variety of securing devices. Two exemplary devices 80, 90 are shown in FIGS. 4 and 5 respectively. The first device 80 is a horn clip. When using this device, the cradle includes horn clip holes 82 through which the respective prongs of the horn clip can be inserted into the cradle chamber 42. When inserted into the chamber, the prongs of the horn clip align with and engage the grooves 28 defined by the dichroic lamp. With the horn clip prongs engaging the grooves, the lamp 20 is secured within the cradle.

The second device, shown in FIG. 5, is an alligator clip 90. The alligator clip includes opposing prongs 92. These prongs include engagement portions 94. The alligator clip 90 is positioned at least partially in the base 44 of the cradle 40. When the socket 30 and lamp 20 are inserted in the chamber 42, the prongs engage the rearward portion of the lamp 20, and bias away from one another, until the engagement portions 94 engage and lock in the grooves 28 defined by the dichroic lamp. With the alligator clip prongs engaging the grooves, the lamp 20 is secured within the cradle. Optionally, the alligator clip may include one or more prongs, provided they engage the grooves 28.

The above description is that of a current embodiment of the invention. Various alterations and changes can be made without departing from the spirit and broader aspects of the invention as defined in the claims, which are to be interpreted in accordance with the principles of patent law including the doctrine of equivalents.

The invention claimed is:

1. A vehicular lamp assembly comprising:
a dichroic lamp including a halogen bulb and a reflector that reflects visible light emitted by the bulb forward, but allows radiant heat to pass rearwardly through the reflector, the dichroic lamp including at least two electrodes that project rearwardly;
a socket defining a terminal on a first surface facing the dichroic lamp, the electrodes inserted at least partially in the terminal, the socket defining at least one of a recess and an aperture on a second surface opposite the dichroic lamp;
a cradle defining a chamber that opens at a first end and that is at least partially bound by a base at an opposite end, the base including a locating pin projecting toward the first end, the dichroic lamp and socket both nested at least partially within the cradle chamber, the locating pin registered in the at least one of the socket recess and aperture to selectively position the dichroic lamp in the cradle; and
a support structure connecting the cradle with at least one of a vehicle panel and a vehicle component, the support structure and cradle cooperating to align the dichroic lamp with a pathway of the vehicle so that the dichroic lamp focuses light on the pathway of the vehicle,
wherein the reflector includes a rearward portion and a longitudinal axis, the rearward portion defining a groove, wherein the groove is perpendicular to the longitudinal axis, wherein a securing device engages the groove to lock the dichroic lamp within the cradle.

2. The vehicular lamp assembly of claim 1 wherein the securing device is a horn clip, wherein the cradle defines a horn clip aperture, and wherein the horn clip is inserted though the horn clip aperture and engages the groove.

3. The vehicular lamp assembly of claim 1 wherein the securing device is an alligator clip including at least two prongs that oppose one another, at least one of the prongs engaging the groove to secure the dichroic lamp within the cradle.

4. The vehicular lamp assembly of claim 3 wherein the dichroic lamp defines at least two grooves, each on opposite sides of the rearward portion, and wherein the at least two prongs each respectively engage one of the grooves.

5. The vehicular lamp assembly of claim 1 wherein the support structure is a retaining frame positioned on the exterior of the at least one of the vehicle body panel and the vehicle component, the retaining frame joined with the cradle, the cradle positioned on the interior of the at least one of the vehicle body panel and the vehicle component and not visible from the exterior of the vehicle.

6. A vehicular lamp assembly comprising:
a dichroic lamp including a halogen bulb and a reflector that reflects visible light emitted by the bulb forward, but allows radiant heat to pass rearwardly through the reflector, the dichroic lamp including a rearwardly projecting electrode;
a socket defining at least one of a recess and an aperture, the electrode plugged into a terminal to connect the socket and dichroic lamp, the socket including a connector coupled to a power source;
a cradle defining a chamber, the socket and dichroic lamp both positioned in the chamber, the cradle including a base and a locating pin that registers with the at least one of a recess and an aperture to selectively locate the dichroic lamp within the cradle;
wherein the cradle is joined with at least one of a vehicle component and a vehicle body panel so that light emitted from the dichroic lamp focuses on a pathway of the vehicle; and
a securing device engaging the dichroic lamp and securing it within the cradle,
wherein the securing device is a horn clip fitted through apertures defined by the cradle and engaging grooves defined by the dichroic lamp.

7. The vehicular lamp assembly of claim 6 wherein the cradle includes a plurality of apertures, wherein a horn clip is positioned through at least two of the holes and engages the dichroic lamp.

8. A vehicular lamp assembly comprising:
a dichroic lamp including a halogen bulb and a reflector that reflects visible light emitted by the bulb forward, but allows radiant heat to pass rearwardly through the reflector, the dichroic lamp including a rearwardly projecting electrode;
a socket defining at least one of a recess and an aperture, the electrode plugged into a terminal to connect the socket and dichroic lamp, the socket including a connector coupled to a power source;

a cradle defining a chamber, the socket and dichroic lamp both positioned in the chamber, the cradle including a base and a locating pin that registers with the at least one of a recess and an aperture to selectively locate the dichroic lamp within the cradle;

wherein the cradle is joined with at least one of a vehicle component and a vehicle body panel so that light emitted from the dichroic lamp focuses on a pathway of the vehicle; and a securing device engaging the dichroic lamp and securing it within the cradle, wherein the securing device is an alligator clip positioned within the chamber, the alligator clip including opposing prongs that pinch the dichroic lamp and secure the dichroic lamp to the cradle.

9. A vehicular lamp assembly comprising:

a dichroic lamp including a halogen bulb and a reflector that reflects visible light emitted by the bulb forward, but allows radiant heat to pass rearwardly through the reflector, the dichroic lamp including a rearwardly projecting electrode;

a socket defining at least one of a recess and an aperture, the electrode plugged into a terminal to connect the socket and dichroic lamp, the socket including a connector coupled to a power source;

a cradle defining a chamber, the socket and dichroic lamp both positioned in the chamber, the cradle including a base and a locating pin that registers with the at least one of a recess and an aperture to selectively locate the dichroic lamp within the cradle;

wherein the cradle is joined with at least one of a vehicle component and a vehicle body panel so that light emitted from the dichroic lamp focuses on a pathway of the vehicle; and a cover joined with the cradle and pressing against the dichroic lamp so that the socket is forced against the base to secure the dichroic lamp within the cradle.

10. A vehicular lamp assembly comprising:

a dichroic lamp including a halogen bulb and a reflector that reflects visible light emitted by the bulb forward, but allows radiant heat to pass rearwardly through the reflector, the dichroic lamp including a rearwardly projecting electrode;

a socket defining at least one of a recess and an aperture, the electrode plugged into a terminal to connect the socket and dichroic lamp, the socket including a connector coupled to a power source;

a cradle defining a chamber, the socket and dichroic lamp both positioned in the chamber, the cradle including a base and a locating pin that registers with the at least one of a recess and an aperture to selectively locate the dichroic lamp within the cradle;

wherein the cradle is joined with at least one of a vehicle component and a vehicle body panel so that light emitted from the dichroic lamp focuses on a pathway of the vehicle; and wherein the base defines a base aperture, and wherein the socket includes wires extending therefrom, the wires positioned through the base aperture and electrically coupled to a power source of the vehicle.

11. A vehicular lamp assembly comprising:

a dichroic lamp including a halogen bulb and a reflector that reflects visible light emitted by the bulb forward, but allows radiant heat to pass rearwardly through the reflector, the dichroic lamp including a rearwardly projecting electrode;

a socket defining at least one of a recess and an aperture, the electrode plugged into a terminal to connect the socket and dichroic lamp, the socket including a connector coupled to a power source;

a cradle defining a chamber, the socket and dichroic lamp both positioned in the chamber, the cradle including a base and a locating pin that registers with the at least one of a recess and an aperture to selectively locate the dichroic lamp within the cradle;

wherein the cradle is joined with at least one of a vehicle component and a vehicle body panel so that light emitted from the dichroic lamp focuses on a pathway of the vehicle; and wherein the cradle includes a plurality of elliptical vents to relieve heat build up generated by the dichroic lamp.

12. A vehicular lamp assembly comprising:

a dichroic lamp including a halogen bulb and a reflector that reflects visible light emitted by the bulb forward, but allows radiant heat to pass rearwardly through the reflector, the dichroic lamp including a rearwardly projecting electrode;

a socket defining at least one of a recess and an aperture, the electrode plugged into a terminal to connect the socket and dichroic lamp, the socket including a connector coupled to a power source;

a cradle defining a chamber, the socket and dichroic lamp both positioned in the chamber, the cradle including a base and a locating pin that registers with the at least one of a recess and an aperture to selectively locate the dichroic lamp within the cradle;

wherein the cradle is joined with at least one of a vehicle component and a vehicle body panel so that light emitted from the dichroic lamp focuses on a pathway of the vehicle; and wherein the base is substantially cylindrical and transitions to a bell-shaped portion.

13. The vehicular lamp assembly of claim 12 wherein the socket is positioned substantially in the base, and the reflector is positioned substantially in the bell-shaped portion of the cradle.

* * * * *